United States Patent
Saneyoshi

(10) Patent No.: US 12,070,137 B2
(45) Date of Patent: *Aug. 27, 2024

(54) STATE ESTIMATION APPARATUS, METHOD, AND PROGRAM STORAGE MEDIUM

(71) Applicant: NEC Corporation, Tokyo (JP)

(72) Inventor: Eisuke Saneyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 947 days.

This patent is subject to a terminal disclaimer.

(21) Appl. No.: 17/042,594

(22) PCT Filed: Mar. 29, 2019

(86) PCT No.: PCT/JP2019/013986
§ 371 (c)(1),
(2) Date: Sep. 28, 2020

(87) PCT Pub. No.: WO2019/189754
PCT Pub. Date: Oct. 3, 2019

(65) Prior Publication Data
US 2021/0076846 A1 Mar. 18, 2021

(30) Foreign Application Priority Data
Mar. 30, 2018 (JP) .................................. 2018-066960

(51) Int. Cl.
*A47F 3/04* (2006.01)
*B01D 46/00* (2022.01)
*F25B 47/02* (2006.01)

(52) U.S. Cl.
CPC ........ *A47F 3/0478* (2013.01); *B01D 46/0086* (2013.01); *F25B 47/025* (2013.01); *B01D 2279/50* (2013.01); *F25B 2700/15* (2013.01)

(58) Field of Classification Search
CPC ... A47F 3/0478; B01D 46/0086; B01D 46/46; B01D 46/71; B01D 46/448;
(Continued)

(56) References Cited

U.S. PATENT DOCUMENTS 11,358,086 B2 * 6/2022 Saneyoshi .......... B01D 46/0086
2003/0024683 A1 2/2003 Nagai et al.
(Continued)

FOREIGN PATENT DOCUMENTS

JP H05-76713 A 3/1993
JP H06-80019 A 3/1994
(Continued)

OTHER PUBLICATIONS

International Search Report for PCT Application No. PCT/JP2019/013986, mailed on Jun. 4, 2019.

*Primary Examiner* — Douglas Kay

(57) ABSTRACT

A state estimation apparatus comprises a power information acquisition part that acquires time-series data of a power value of a freezer showcase; a power information storage part that stores power information during an intermittent operation of the freezer showcase in a normal state; an evaluation part that evaluates power information during the intermittent operation of the freezer showcase from the time-series data of the power value and derives a degree of difference from the power information during the intermittent operation of the freezer showcase in a normal state; a filter cleaning determination part that estimates how clogged a filter of the freezer showcase is based on the degree of difference and determines whether or not the filter needs to be cleaned; and an output part that provides, for a determination result indicating that the cleaning of the filter is necessary, an output to that effect.

9 Claims, 11 Drawing Sheets

(58) Field of Classification Search
CPC ............... B01D 2279/50; F25B 47/025; F25B 2700/15; F25B 49/005; F25D 11/00; F25D 23/00
See application file for complete search history.

(56) References Cited

U.S. PATENT DOCUMENTS

| | | | |
|---|---|---|---|
| 2003/0217560 A1 | 11/2003 | Kasuya et al. | |
| 2015/0330650 A1* | 11/2015 | Abiprojo | F24F 11/39 700/276 |
| 2018/0238616 A1* | 8/2018 | Preston | F25B 25/005 |

FOREIGN PATENT DOCUMENTS

| | | | |
|---|---|---|---|
| JP | H06-235577 A | | 8/1994 |
| JP | H07-199749 A | | 8/1995 |
| JP | H07-262766 A | | 10/1995 |
| JP | H08-257332 A | | 10/1996 |
| JP | 2002-369105 A | | 12/2002 |
| JP | 2004-45018 A | | 2/2004 |
| JP | 2004-113681 A | | 4/2004 |
| JP | 2005-106323 A | | 4/2005 |
| JP | 2006-288513 A | | 10/2006 |
| JP | 2008-151452 A | | 7/2008 |
| JP | 2008-262033 A | | 10/2008 |
| JP | 2012-117752 A | | 6/2012 |
| JP | 2012-255586 A | | 12/2012 |
| JP | 2013182470 A | * | 9/2013 |
| JP | 2014-066446 A | | 4/2014 |
| JP | 2014-105932 A | | 6/2014 |
| JP | 2016-223711 A | | 12/2016 |
| JP | 2018063572 A | * | 4/2018 |

* cited by examiner

STATE ESTIMATION APPARATUS, METHOD, AND PROGRAM STORAGE MEDIUM

FIELD

DESCRIPTION OF RELATED APPLICATION

This application is a National Stage Entry of PCT/JP2019/013986 filed on Mar. 29, 2019, which claims priority from Japanese Patent Application 2018-066960 filed on Mar. 30, 2018, the contents of all of which are incorporated herein by reference, in their entirety.

The present invention relates to a state estimation apparatus, a method, and a program storage medium.

BACKGROUND

In stores such as convenience stores and supermarkets, many cooling apparatuses (e.g., freezer showcases) for displaying refrigerated/frozen foods are installed.

For example, Patent Literatures (PTLs) 1 and 2 each discuss an example of a freezer showcase. FIG. 1 is a diagram illustrating a configuration example of a flat-type open showcase.

In FIG. 1, cold air is supplied from a supply opening 213 at one end of an air duct 212 to a display room (an open showcase) 215, and air (high temperature) is suctioned into a suction opening 214 at the other end of the air duct 212. Next, an evaporator 204 performs heat exchange on the air (high temperature), and a fan 211 blows the obtained low-temperature air out of the supply opening 213. As a result of the heat exchange by the evaporator 204, a refrigerant (liquid) is vaporized and low-pressure gas is supplied to a compressor 201. This low-pressure gas is compressed by the compressor 201 to be converted into high-temperature and high-pressure gas. The high-temperature and high-pressure gas is supplied to a condenser 202, at which the high-temperature and high-pressure is heat exchanged with low-temperature water. Consequently, the gas is converted into high-pressure liquid, which is expanded by an expander 203. As a result, the high-pressure liquid is converted into low-pressure liquid. This low-pressure liquid is supplied from the expander 203 to the evaporator 204. That is, the compressor 201, the condenser 202, the expander 203, and the evaporator 204 constitute a freezing cycle.

When the evaporator 204 performs a defrosting operation, a bypass valve 205 is opened, and the high-temperature and high-pressure gas is supplied from the compressor 201 to the evaporator 204. In a case where a heater system is adopted, when the evaporator 204 performs a defrosting operation, a defrosting heater 210 is operated. In a machine room under the display room 215, cooling apparatuses such as the compressor 201 and the condenser 202 that constitute the above freezing cycle, a fan 208 that cools down the condenser 202, etc., a control apparatus 209, etc. are installed. An outside air intake opening for taking in the outside air is formed on one side wall of the machine room, and a waste heat opening 207 is formed on the other side wall. An air filter 206 (also referred to as a filter) for filtering dust is removably mounted near the outside air intake opening. On the side of the suction opening 214 in the air duct 212, there are cases in which an anemometer for monitoring a ventilation status between the supply opening 213 and the suction opening 214 is installed. A temperature sensor (not illustrated) is arranged in the display room 215 or near the supply opening 213 in the air duct 212, and the control apparatus 209 controls a temperature control operation (ON/OFF control of the cooling operation).

The most common cause of malfunctions of the freezer showcase 20 is said to be clogging of the filter of the air-cooled condenser 202. When the filter 206 is clogged by trash or dust, a cooling performance is deteriorated. If this state is continuously neglected, the freezer showcase 20 could malfunction. Thus, it is necessary to clean the filter 206 when the freezer showcase 20 is used. For example, generally, the vendor or the like of the freezer showcase 20 recommends regular cleaning about once in one or two weeks. However, since the filter 206 is close to a store floor, clogging of the filter progresses differently depending on an environment of a customer store, the number of customers, etc. In addition, it is often the case that store employees or part-time workers fail to clean the filter.

Various techniques have been disclosed as a technique for notification of a filter cleaning time in relation to freezer showcases and other apparatuses.

PTL 3 discloses a technique for grasping a cleaning time of an air filter of a cooling mechanism in an optical drive system. According to PTL 3, time in which a drive main body is driven by a power supply is measured cumulatively. When a predetermined time is counted, the user is notified that an air filter cleaning time (or replacement time) has been reached.

PTL 4 discloses a technique for detecting clogging of a filter in an air-conditioning apparatus such as an air purifier or an air-cooling and -heating apparatus by using light. PTL 4 discusses accurately detecting change in transmittance and stably detecting filter clogging by appropriately disposing a light emitting part and a light receiving part with respect to the filter and air current.

Since the number of rotations of a fan or a motor also fluctuates due to an ambient temperature, a motor winding temperature, or a power supply voltage, if filter clogging is detected only based on the number of rotations, a large error could occur. To address this problem, PTL 5 discloses a technique for determining filter clogging by measuring a pressure difference between a location before a filter of a ventilator and blower apparatus and a location after the filter.

PTL 6 discloses a technique for detecting a cleaning time of an air filter of an air-conditioner. From relationship between an amount of air that passes through the air filter and the number of rotations of a fan (or a control value thereof), whether the air filter is in a normal or clogged state is determined. However, in accordance with the technique in PTL 6, an additional sensor needs to be installed in the apparatus. Thus, it is difficult to introduce this technique in a freezer showcase that has already been used in a customer stores.

PTL 7 discloses an overheat protection apparatus and a projector equipped therewith. By measuring an outside temperature and an outside atmospheric pressure at which a apparatus is used, grasping an environment in which the apparatus is used, and accurately determining a degree of clogging of an air filter, the overheat protection apparatus can control the number of rotations of a cooling fan, turn off a power supply, and output a sign recommending a user to clean or replace the air filter, depending on a use environment.

PTL 8 discloses a floor level cleaner equipped with a filter clogging detection function of measuring a current value of a blower in a certain operation and detecting filter clogging based on change of the current attribute to filter clogging. According to PTL 8, detection of filter clogging is enabled without using a device such as a pressure sensor, thereby achieving cost reduction. According to the technique in PTL 8, since only the fun uses a current, to apply this technique to a freezer showcase, a sensor or the like that measures a current value of only the fan is needed. It is difficult to introduce this technique in a freezer showcase that has already been used in a customer stores.

PTL 9 discloses a technique for calculating a filter cleaning priority level based on a temperature inside a showcase and an operating status thereof. According to PTL 9, from diagnostic internal information and operation control information about the showcase, a load factor of the showcase is calculated. Next, from a degree of the load factor, dirtiness of a cooling apparatus is grasped. However, to access the internal diagnostic information, etc., cooperation or the like from a manufacturer of the freezer showcase or the like is needed. In addition, an apparatus for the information collection is also needed.

PTL 1: Japanese Unexamined Patent Application Publication No. 2004-45018
PTL 2: Japanese Unexamined Patent Application Publication No. 2008-151452
PTL 3: Japanese Unexamined Patent Application Publication No. Hei 7-262766
PTL 4: Japanese Unexamined Patent Application Publication No. 2014-66446
PTL 5: Japanese Unexamined Patent Application Publication No. 2005-106323
PTL 6: Japanese Unexamined Patent Application Publication No. Hei 8-257332
PTL 7: Japanese Unexamined Patent Application Publication No. 2008-262033
PTL 8: Japanese Unexamined Patent Application Publication No. 2006-288513
PTL 9: Japanese Unexamined Patent Application Publication No. 2016-223711

SUMMARY

It takes a different time (period) for a clogging state of a freezer showcase to reach a filter cleaning time, depending on an installation environment or the like. According to the related techniques, to install a system that gives a notification of a filter cleaning time, an existing freezer showcase or a management system needs to be modified or altered. For example, to determine a filter cleaning time in consideration of an installation environment of a freezer showcase, a sensor or the like for acquiring the installation environment (external environment) is separately needed.

It is extremely difficult to modify or alter a freezer showcase, that has already been installed in a store of a supermarket, convenience store and so forth, developed in an area wide or a nation wide scale. That is, it is difficult to facilitate introduction of a system that gives a notification of a filter cleaning time to a customer stores or the like. in which a freezer showcase has already been installed.

The present invention has been made in view of the above problems, and it is an object of the present invention to provide an apparatus, a method, and a program medium, each facilitating determination of necessity of filter cleaning at a customer store or the like in which a freezer showcase has already been installed, with no need to modify or alter a freezer showcase, etc., and to perform installation or the like of a sensor for acquiring environmental information.

Solution to Problem

According to one mode of the present invention, there is provided a state estimation apparatus comprising: a power information acquisition part that acquires time-series data of a power value of a freezer showcase; a power information storage part that stores power information during an intermittent operation of the freezer showcase in a normal state; an evaluation part that evaluates power information during the intermittent operation of the freezer showcase from the time-series data of the power value and derives a degree of difference between the evaluated power information and the power information during the intermittent operation of the freezer showcase in a normal state; a filter cleaning determination part that estimates a clogging state of a filter of the freezer showcase based on the degree of difference to determine whether cleaning of the filter is necessary; and an output part that provides, for a determination result indicating that the cleaning of the filter is necessary, an output to that effect.

According to one mode of the present invention, there is provided a state estimation method including:
acquiring time-series data of a power value of a freezer showcase;
evaluating power information during an intermittent operation of the freezer showcase from the time-series data of the power value to derive a degree of difference from power information during the intermittent operation of the freezer showcase in a normal state; and
estimating a clogging state of a filter of the freezer showcase based on the degree of difference to determine whether cleaning of the filter is necessary.

According to a mode of the present invention, there is provided a program causing a computer to execute processing comprising:
acquiring time-series data of a power value of a freezer showcase;
evaluating power information during an intermittent operation of the freezer showcase from the time-series data of the power value to derive a degree of difference from power information during the intermittent operation of the freezer showcase in a normal state; and
estimating a clogging state of a filter of the freezer showcase based on the degree of difference to determine whether cleaning of the filter is necessary.

According to a mode of the present invention, there is provided a program storage medium in which the program is stored. For example, this program storage medium is provided as a non-transitory computer-readable storage medium such as a semiconductor storage such as a RAM (Random Access Memory), a ROM (Read-Only Memory), or an EEPROM (Electrically Erasable And Programmable ROM), a HDD (Hard Disk Drive), a CD (Compact Disc), or a DVD (Digital Versatile Disc).

The present invention can facilitate determination of necessity of filter cleaning at a customer store or the like in which a freezer showcase has already been installed, with no need to modify or alter a freezer showcase, and to perform installation or the like of a sensor for acquiring environmental information. Still other features and advantages of the present invention will become readily apparent to those skilled in this art from the following detailed description in conjunction with the accompanying drawings where only exemplary embodiments of the invention are shown and described, simply by way of illustration of the best mode contemplated of carrying out this invention.

As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

A mode of the present invention will be described. According to a mode of the present invention, the following is performed:

evaluating a degree of difference between power information acquired from a power supply part (e.g., a distribution board, a power tap (power strip), or the like) of a freezer showcase, and power information of the freezer showcase with a filter thereof being in a normal state, and estimating, based on the degree of difference, a clogging state of the filter to determine whether cleaning of the filter is necessary.

According to the mode of the present invention, only power information needs to be measured to determine whether cleaning of a filter (an air filter of an air-cooled condenser) of a freezer showcase is necessary. That is, estimation of a clogging state of the filter can be implemented, for example, on a management system that manages power energy of store facilities. Thus, there is no need to modify or alter the freezer showcase installed in the customer store. In addition, there is no need to install a sensor (a pressure sensor, a temperature sensor) or the like, for acquiring environmental information about the freezer showcase. As a result, it is possible to facilitate determination of necessity of filter cleaning at customer stores, etc. where freezer showcases have already been installed.

Figure 1:
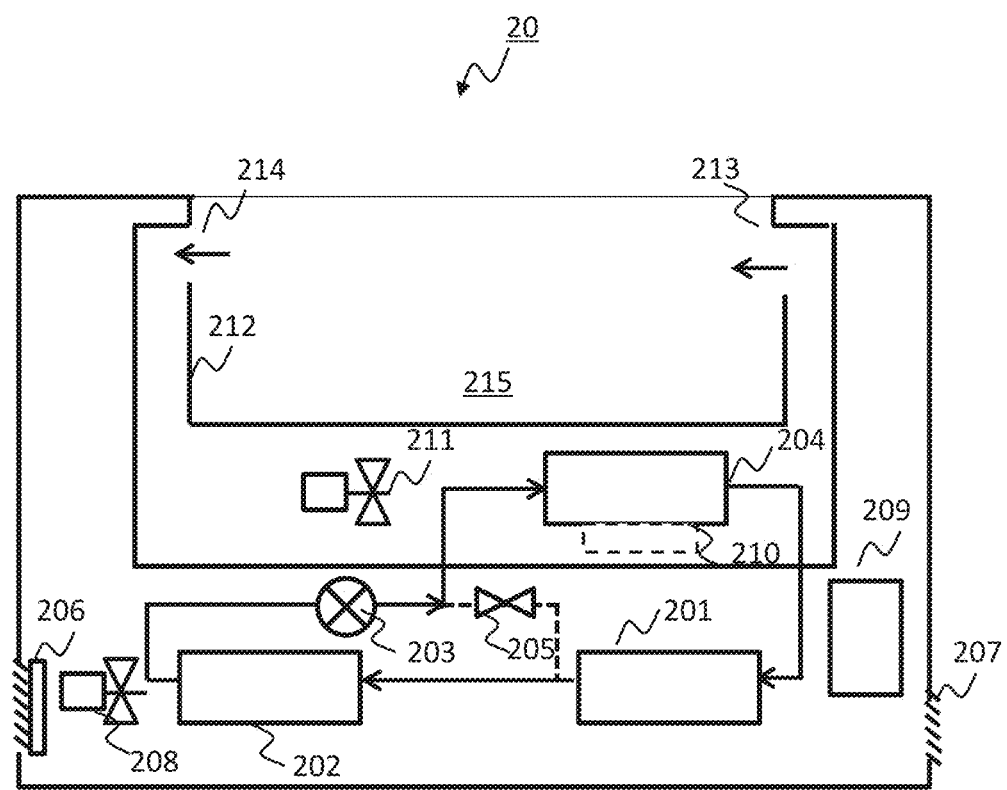
FIG. 1 is a diagram illustrating a configuration example of a freezer showcase.
Figure 2:
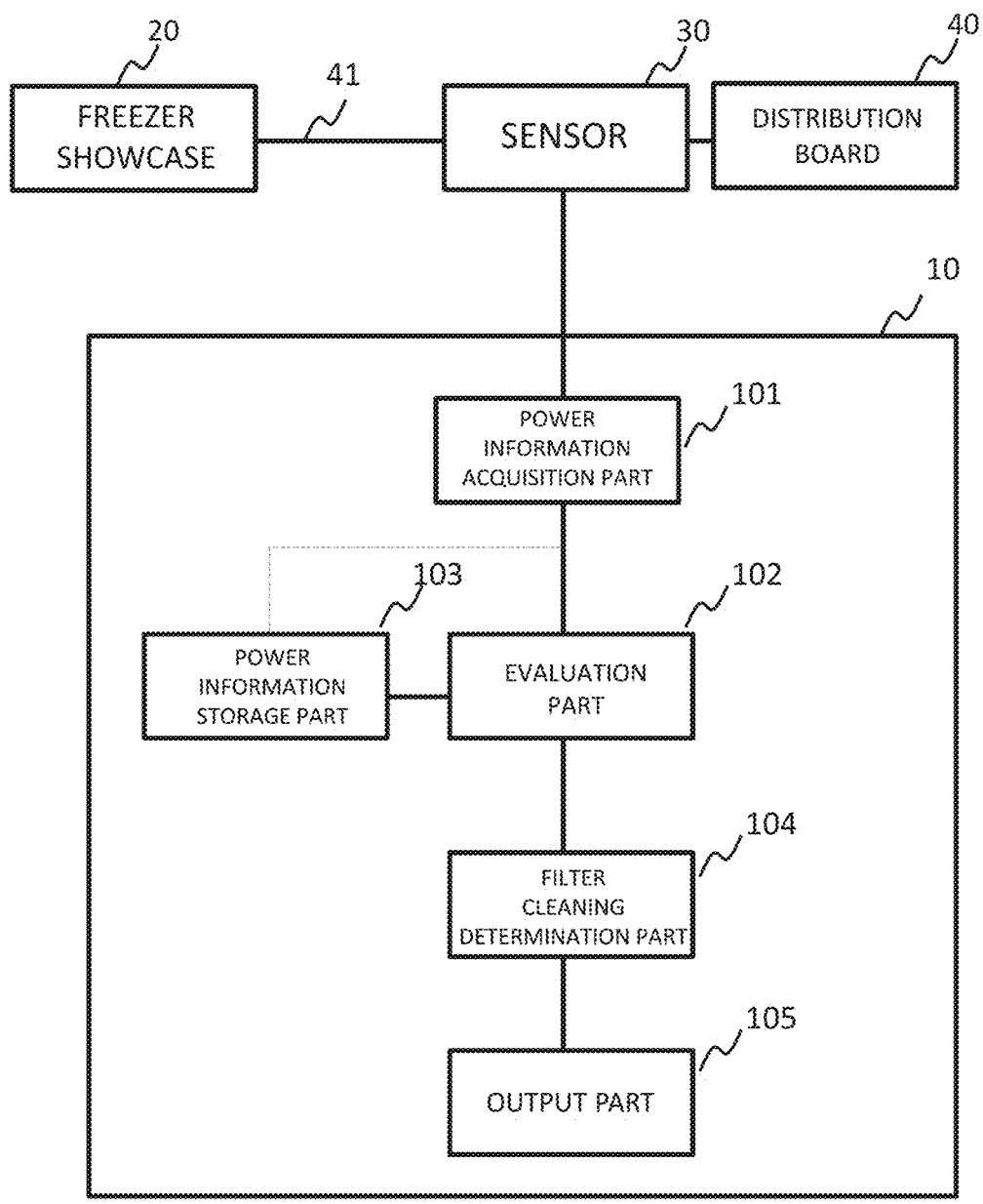
FIG. 2 is a diagram illustrating a configuration example according to an example embodiment of the present invention.

FIG. 2 is a diagram illustrating an example embodiment of the present invention. A freezer showcase 20 may be the freezer showcase 20 described with reference to FIG. 1. The following describes the example embodiment also with reference to FIG. 1.

In FIG. 2, a sensor 30 includes a power sensor and acquires power information at a power supply part of the freezer showcase 20. A state estimation apparatus 10 receives time-series data of a power-value acquired by the sensor 30.

The state estimation apparatus 10 includes a power information acquisition part 101, an evaluation part 102, a power information storage part 103, a filter cleaning determination part 104, and an output part 105.

The power information acquisition part 101 acquires power information (time-series data of a power-value) from the sensor 30 and temporarily stores the power information in its internal buffer memory (not illustrated) or the like.

The evaluation part 102 evaluates degree of difference between power information about the freezer showcase 20 that is stored in advance in the power information storage part 103 and that corresponds to a normal state of a filter, and the power information about the freezer showcase 20 currently acquired by the power information acquisition part 101 respectively. As the degree of difference, the evaluation part 102 may perform quantitative evaluation based on numerical values. Alternatively, the evaluation part 102 may express the degree of difference by classifying the degree of difference into one of categories (ranks) such as a large change, an intermediate change, a small change, no change, etc.

Based on the degree of difference outputted from the evaluation part 102, the filter cleaning determination part 104 estimates a clogging state of the filter 206 of the freezer showcase 20 to determine whether cleaning of the filter is necessary.

When the determination result by the filter cleaning determination part 104 indicates that the cleaning of the filter of the freezer showcase 20 is necessary, the output part 105 notifies (displays) to that effect. The output part 105 may notify, via communication means, a management terminal or a point-of-sale (POS) register terminal of the corresponding store or a portable terminal or the like of an employee or a part-time worker that the cleaning of filter of the freezer showcase 20 is necessary.

The power information storage part 103 may receive the power-value time-series data from the power information acquisition part 101 in advance (before the state estimation apparatus 10 determines whether cleaning of the filter is necessary), derive power information corresponding to a normal operation of the freezer showcase 20, and store the power information therein. Immediately after the filter 206 of the freezer showcase 20 is cleaned, the current-value time-series data may be received from the power information acquisition part 101, supplied to the power information storage part 103 of the state estimation apparatus 10, and stored as the power information corresponding to the normal operation of the freezer showcase 20 in the power information storage part 103. Alternatively, a user may perform setting input of the power information corresponding to the normal operation of the freezer showcase 20 in the power information storage part 103, from a control terminal or the like not illustrated.

According to the example embodiment of the present invention, it is only necessary to measure power information to determine whether to clean the filter 206. The example embodiment facilitates introduction to a customer store where the freezer showcase 20 has already been installed without touching the freezer showcase 20 (alteration or the like of the freezer showcase 20 is not necessary).

A distribution board 40 is given as an example of the power supply part of the freezer showcase 20. The freezer showcase 20 is connected to a branch wire (feeder wire) 41 of the distribution board 40. The sensor 3 acquires a current flowing through the branch wire 41 of the distribution board 40 and forwards the power information to the power information acquisition part 101 via a communication interface (not illustrated) in the sensor 30.

The power information acquisition unit 101 may acquire the power of a power outlet of the freezer showcase 20, as the power supply unit of the freezer showcase 20.

The power information acquisition part 101 may, at a time when determination of necessity of the filter cleaning is performed, transmit, to the sensor 30, a measurement command instructing the sensor 30 to measure a current value and transmit time-series data of the power value. In this case, based on the measurement command, the sensor 30 may measure a power consumed by the freezer showcase 20 and transmit the measurement result to the power information acquisition part 101.

A state immediately after an operation is started, immediately after the filter is cleaned, immediately after the filter is replaced or the like may be given as the normal state of the filter 206. The timing at which determination of necessity of the filter cleaning is performed may have a width of a certain period of time. For example, when determination of necessity of the filter cleaning is performed and it is determined that the filter does not need to be cleaned, next determination of necessity of the filter cleaning may be performed after a predetermined time from the day on which the determination of necessity of the filter cleaning is performed. Alternatively, if it is estimated that clogging state of the filter is rather making some progress while cleaning is not needed, a period of time until the next determination of necessity of the filter cleaning is performed, may be shortened. Regarding the timing at which determination of necessity of the filter cleaning is performed, a timing at which a next determination of necessity of the filter cleaning is performed may be set in a timer (a system clock) or the like (not illustrated) held in a state estimation apparatus 10 and when the timer times out, the power information acquisition part 101 may transmit a measurement command to the sensor 30 and acquire a measurement result about the current of the freezer showcase 20 from the sensor 30 (power-value time-series data).

Figure 3:
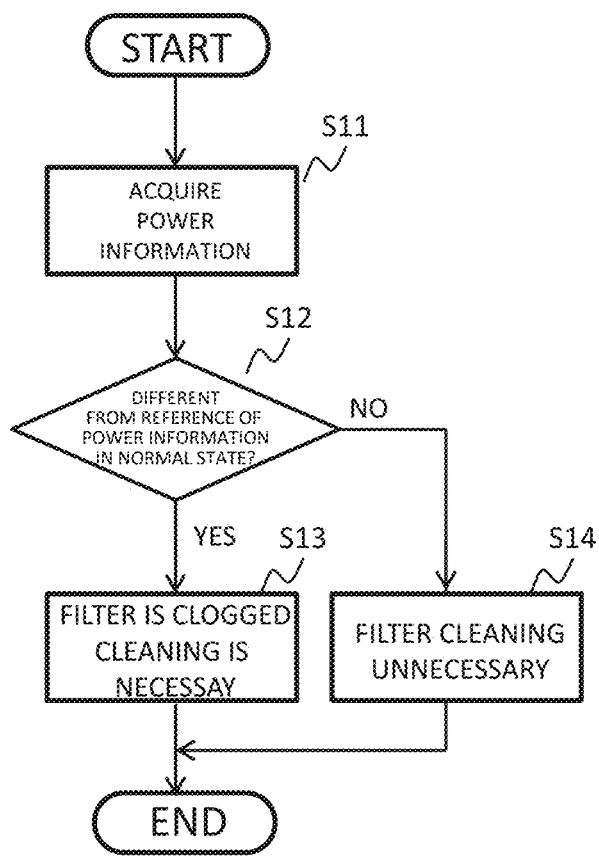
FIG. 3 is a flowchart illustrating the example embodiment of the present invention.

FIG. 3 is a flowchart illustrating an operation according to the example embodiment. The power information acquisition part 101 acquires power information about the freezer showcase 20 (S11). The evaluation part 102 evaluates a degree of difference between the acquired power information and power information in the normal state of the filter 206 stored in advance in the power information storage part 103 (S12) and determines whether the degree of difference is different from the power information in the normal state (S12).

If the degree of difference is different from a reference of the power information in the normal state (YES branch in S13), the filter cleaning determination part 104 estimates that the filter 206 is in a state where clogging has progressed and determines that filter cleaning is necessary (S13). If the degree of difference matches the reference of the power information in the normal state or falls within the reference in the normal state (NO branch in S13), the filter cleaning determination part 104 determines that the filter cleaning is not necessary (S15).

In the freezer showcase 20, the clogging of the filter 206 affects an operating efficiency of the air blower 208, the compressor 201, etc. A frequency of a temperature control operation (intermittent operation) in the freezer showcase 20 varies according to a change in the operation efficiency. The intermittent operation is turned ON (e.g., the compressor 201, etc., are turned ON) until an internal temperature of the freezer showcase 20 (e.g., a temperature in the open showcase 215) decreases to $T_1$, the intermittent operation is turned OFF (the compressor 201, etc., are turned OFF) when the internal temperature drops to $T_1$, and then the internal temperature rises. When the internal temperature increases to $T_2$ ($T_1 < T_2$), The intermittent operation is turned ON (the compressor 201, etc., are turned ON) and the internal temperature drops.

In the exemplary embodiment, the filter cleaning determination part 104 determines that the filter is clogged when the frequency of the intermittent operation (e.g., the number of the intermittent operations within a predetermined period of time) after a defrosting operation is below a lower limit set in advance according to an index indicating the frequency of the intermittent operation during normal operation. Alternatively, when the index indicating the frequency of the intermittent operation during normal operation is set as, for instance, the cooling operation time after a defrosting operation, the filter cleaning determination part 104 determines that the filter is clogged when the frequency of the intermittent operation after a defrosting operation exceeds an upper limit set according to the index.

The frequency of the intermittent operation may be grasped by referencing to instantaneous power-value time-series data of the freezer showcase 20 acquired by the power information acquisition part 101, and by measuring a ratio of time during which the cooling operation is ON (compressor 201, etc. are ON) in a constant period of time. If the ratio is a predetermined value or more, the filter cleaning determination part 104 determine that the filter is in a clogged state. Alternatively, 1/(cooling operation time+cooling stop time) in one cycle of the intermittent operation may be used as the frequency of the intermittent operation. In this case, when the cooling operation time increases, the frequency of the intermittent operation drops, and the frequency falls below a lower limit of the frequency corresponding to the normal operation in which the filter 206 is not clogged, the filter cleaning determination part 104 may estimate that the filter 206 is in a state in which the clogging has progressed and determine that the filter cleaning is necessary.

Figure 4:
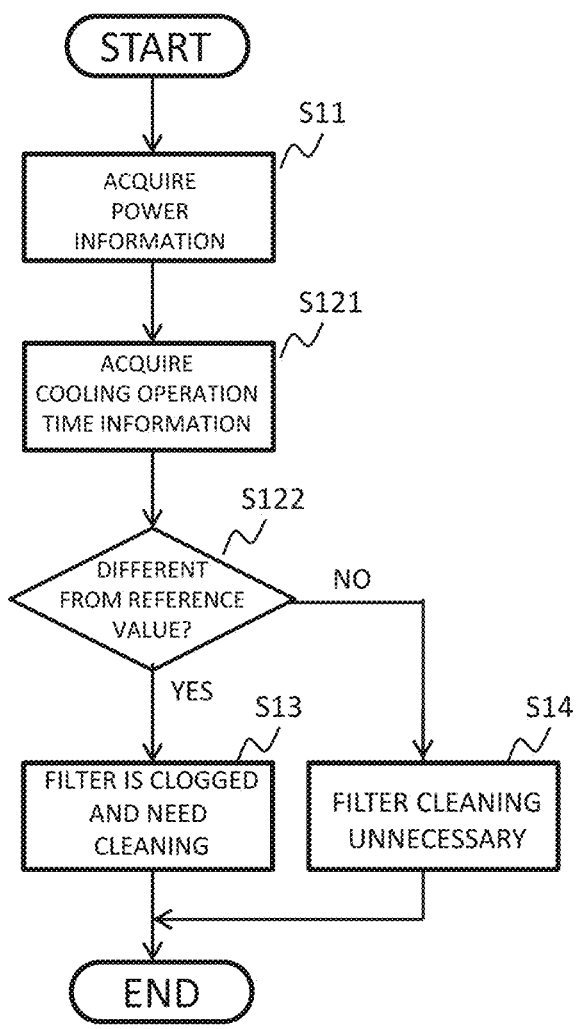
FIG. 4 is a flowchart illustrating an example according to an example embodiment of the present invention.

FIG. 4 is a flowchart explaining a concrete example of the flowchart shown in FIG. 3. In FIG. 4, the steps S11, S13, and S14 are the same as those in FIG. 3.

The evaluation part 102 evaluates the cooling operation time after a defrosting operation in the power information acquired by the power information acquisition part 101, and outputs as the degree of difference a result of comparison of the cooling operation time after a defrosting operation with the filter 206 of the freezer showcase 20 in a normal state, stored in the power information storage part 103, and the cooling operation time in the acquired power information (S121). The filter cleaning determination part 104 compares the degree of difference with a reference value (threshold value) (S122) to determine that the filter cleaning is necessary when the degree of difference is different from the reference (S13). The filter cleaning determination part 104 determines that the filter cleaning is not necessary when the degree of difference matches the reference or is within a range of the reference (S14).

Based on the power-value time-series data (or power consumption information estimated therefrom) acquired from the power information acquisition part 101, the power information storage part 103 may in advance calculate the after-defrosting-operation cooling operation time in the normal state of the filter 206 of the freezer showcase 20 and may store the after-defrosting-operation cooling operation time therein. Alternatively, a manager or the like may, by using a terminal not illustrated, perform setting input of the after-defrosting-operation cooling operation time in the normal state of the filter 206 of the freezer showcase 20.

Figure 5:
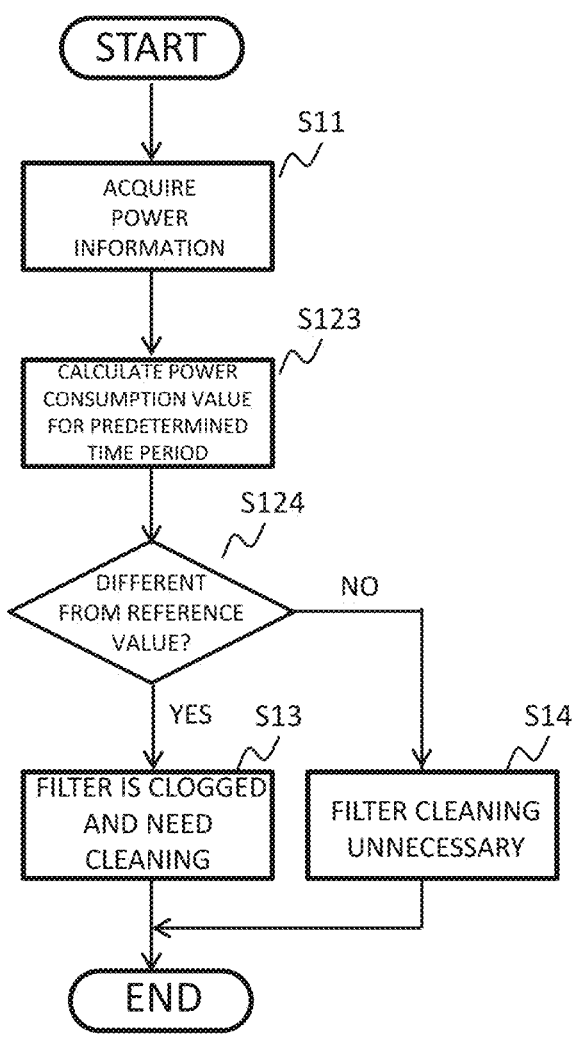
FIG. 5 is a flowchart illustrating another example according to the example embodiment of the present invention.

FIG. 5 is a flowchart explaining another concrete example of the flowchart shown in FIG. 3. The evaluation part 102 evaluates a power amount (electric energy) during a predetermined period of time after a defrosting operation in the power information acquired by the power information acquisition part 101, and outputs as the degree of difference a result of comparison of the power amount during the predetermined period of time after a defrosting operation, stored in the power information storage part 103, with the filter 206 of the freezer showcase 20 in a normal state with the power amount during the predetermined period of time in the acquired power information (S123). The filter cleaning determination part 104 compares the degree of difference with a reference value (threshold value) (S124) and determines that the filter needs to be cleaned when it is different from the reference value (S13). The filter cleaning determination part 104 determines that cleaning of the filter is unnecessary when the degree of difference matches the reference or is within a reference range (S14).

The power information storage part 103 may calculate the power amount during a predetermined period of time after a defrosting operation, stored in the power information storage part 103, with the filter 206 of the freezer showcase 20 in a normal state based on power-value time-series data received from the power information acquisition part 101 in advance and stored. Alternatively, an administrator may perform setting and input of the power amount, using a terminal (not shown), during the predetermined period of time after a defrosting operation with the filter 206 of the freezer showcase 20 in a normal state.

Figure 6A:
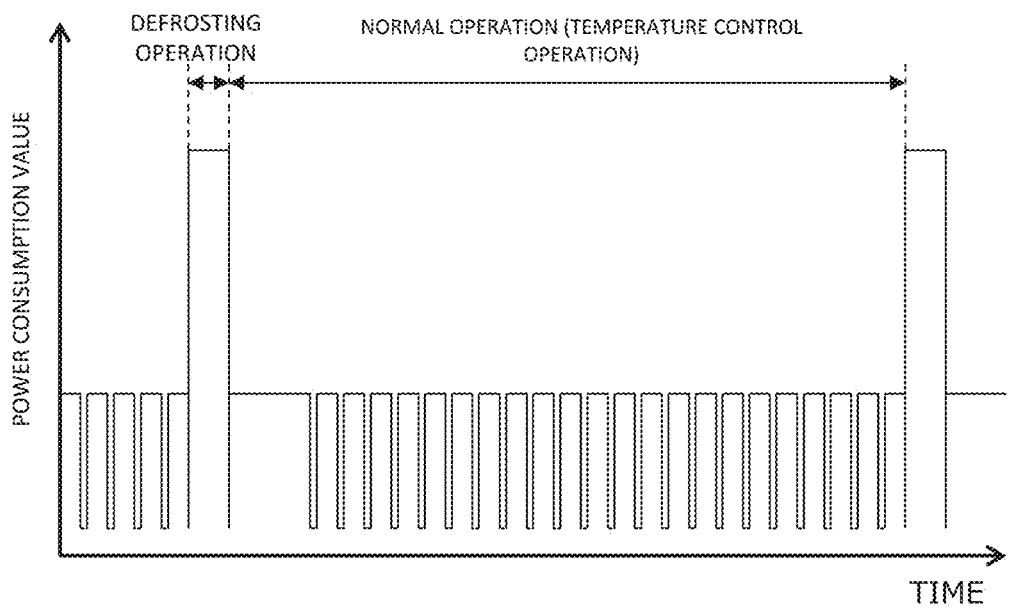
FIG. 6A is a diagram illustrating an example of a time-series pattern of a power consumption value in a normal operation performed, for example, immediately after filter cleaning.
Figure 6B:
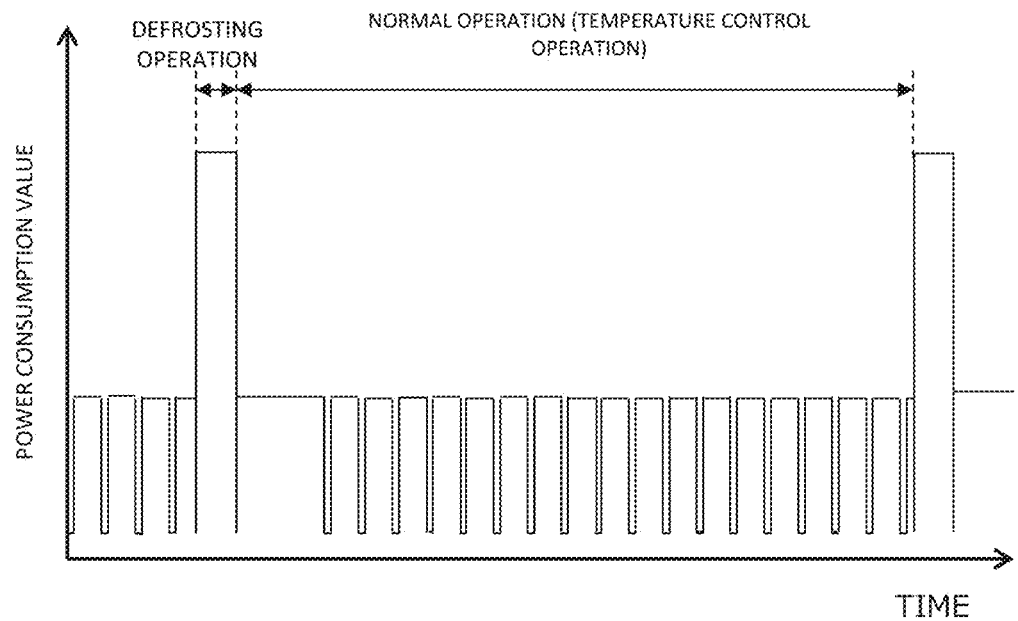
FIG. 6B is a diagram illustrating an example of a time-series pattern of a power consumption value in a state in which a filter is clogged.

FIG. 6A is a diagram illustrating an example of the power consumption in a temperature control operation in the normal state after the defrosting operation. FIG. 6B is a diagram illustrating an example of the power consumption in the temperature control operation after the defrosting operation in a filter clogging state. In FIGS. 6A and 6B, a horizontal axis represents time, and a vertical axis represents power consumption value. When the freezer showcase 20 performs a defrosting operation, in the case of a heater system, the heater 210 turns on. The defrosting operation of the freezer showcase 20 is performed by an internal timer of the control apparatus 209 every 8 or 12 hours or at a setting time, for example. In the normal operation (the temperature control operation), depending on the set temperature, the compressor is turned ON/OFF (within a temperature range about from 3 or 4° C.). The compressor is turned on for 15 to 20 minutes for example, and is turned off for 5 to 10 minutes, for example (the ON-time and the OFF-time are not limited to these examples).

Figure 7:
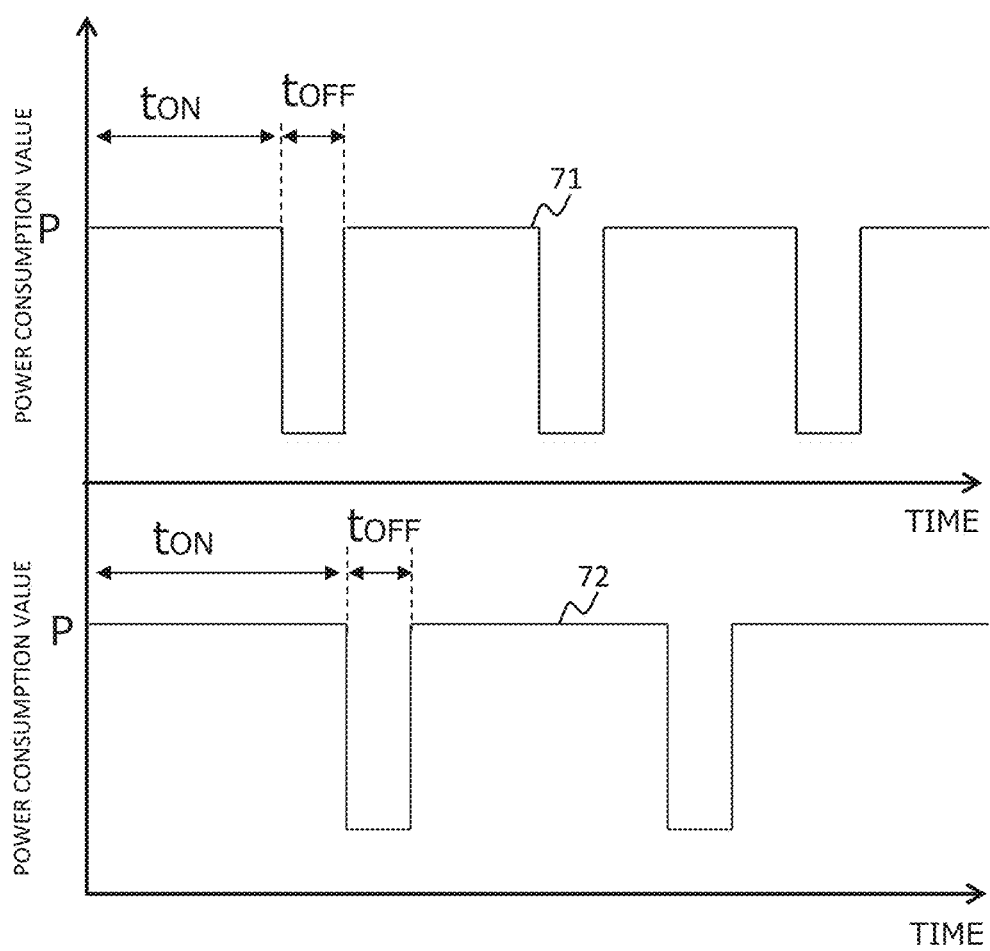
FIG. 7 is a diagram illustrating a relationship between an intermittent operation performed when a filter is in a normal state and an intermittent operation performed when a filter is clogged.

FIG. 7 is a diagram illustrating a power waveform 71 of the temperature control operation in FIG. 6A and a power waveform 72 of the temperature control operation in FIG. 6B. A horizontal axis represents time, and a vertical axis represents a power consumption value. Since only heat exchange is performed between an inside of the freezer showcase 20 and an outside air, OFF is performed (the compressor 201, etc. are turned OFF) for a constant time (to F F), irrespective of clogging of the filter 206. ON (the compressor 201, etc., are turned ON) corresponds to an amount of work in the freezing cycle. For example, when the filter 206 is clogged and an air volume drops, the cooling efficiency drops. In such cases, an ON time (to N) is elongated. In FIG. 7, only for the sake of simplicity, a constant value P is assumed to be the power value in the ON time (to N).

As the ON time (to N) becomes longer, the power amount=P×$t_{O\ N}$ is increased. The evaluation part 102 may calculate a constant time of power amount after a defrosting operation time (W=$\Sigma_i P_i \times t_{i\ O\ N}$, where $P_i$ is the power value in a time period $t_{i\ O\ N}$, i=1, ... N, N is the number of cycles of the intermittent operation). The filter cleaning determination part 104 may compare this power amount with the predetermined period after-defrosting-operation power amount in a normal state of the freezer showcase 20, estimate the clogging state of the filter, and determine necessity of cleaning of the filter. The defrosting operation period may be acquired based on a magnitude of the current value (the estimated power value) based on the power information acquired by the power information acquisition part 101.

Figure 8:
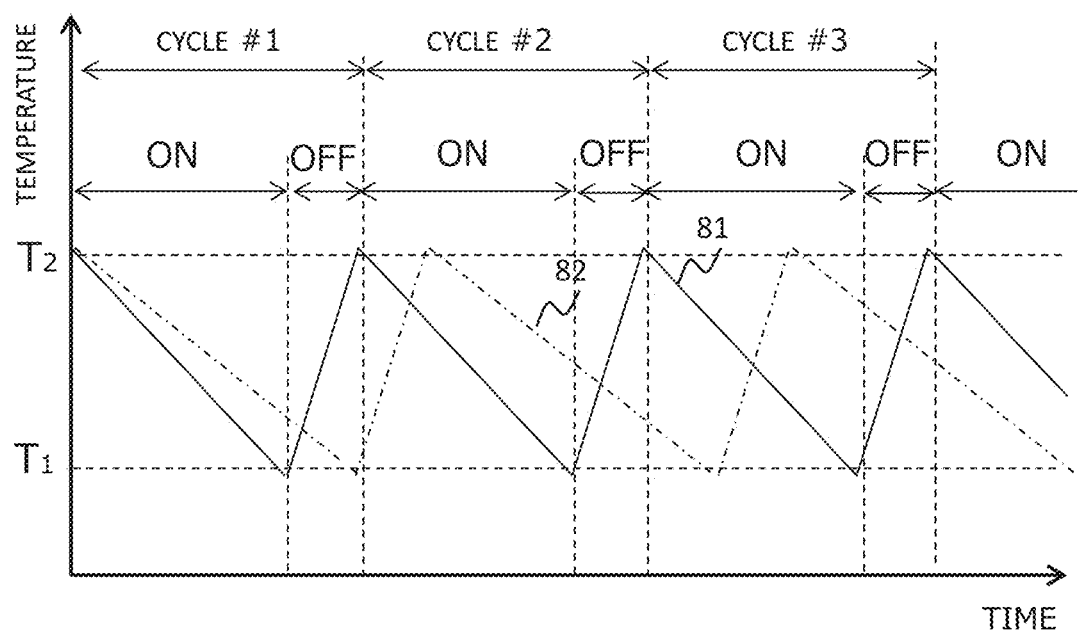
FIG. 8 is a diagram illustrating a relationship between a freezing cycle operation performed when a filter is in a normal state and a freezing cycle operation performed when a filter is clogged.

FIG. 8 illustrates intermittent operations corresponding to the power waveforms of the temperature control operations in FIG. 7. A solid line 81 is a diagram illustrating an intermittent operation performed when a filter is in a normal state, and an alternate long and short dash line 82 is a diagram illustrating an intermittent operation performed when a filter is clogged. The ON time (the compressor 201, etc., are turned On) continues until the temperature inside the freezer showcase 20 drops to $T_1$. When the temperature reaches $T_1$, the OFF time is started (the compressor 201, etc., are turned OFF), and the temperature inside the freezer showcase 20 begins to rise. When the temperature inside the freezer showcase 20 rises and reaches $T_2$ the ON time is started (the compressor 201, etc. are turned ON), and the temperature inside the freezer showcase 20 begins to drop. A combination of an ON time and an OFF time is one cycle of the intermittent operation.

When the filter 206 is clogged, since the ON period becomes longer than that in a normal state, a value (cycle) of an individual ON period plus an individual OFF period is elongated (the frequency is decreased).

Figure 9:
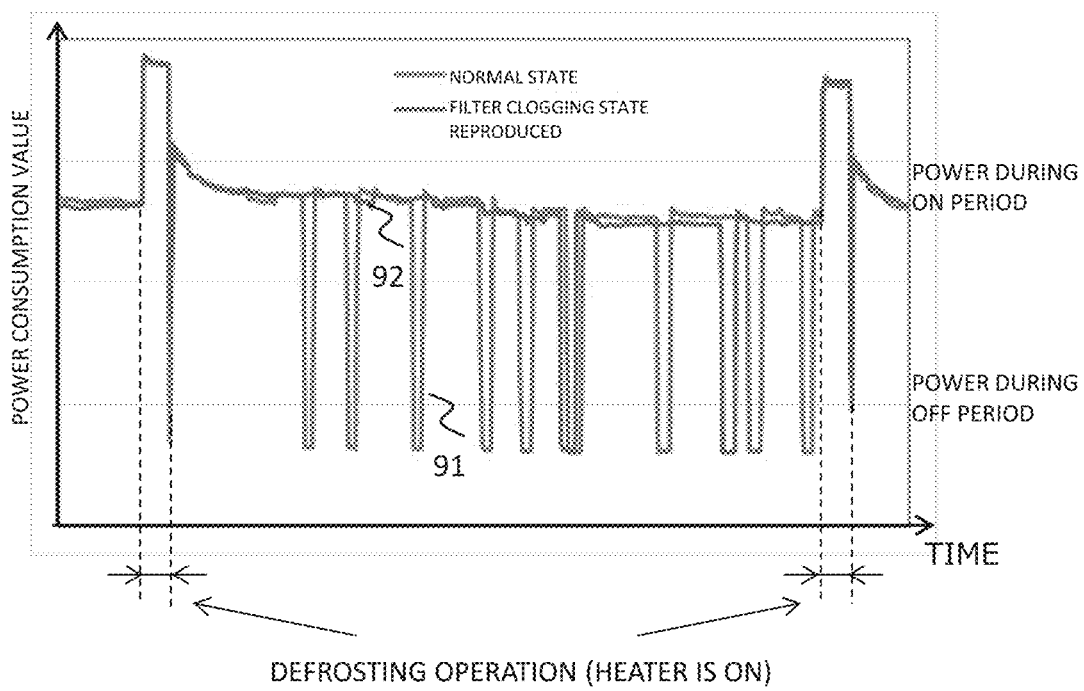
FIG. 9 is a diagram illustrating a measurement result about a power consumption value obtained when a filter is in a normal state and a power consumption value obtained when a filter is clogged.

FIG. 9 is a diagram illustrating an experimental result about fluctuation of power consumption in a period in which the freezer showcase 20 is operated (in two defrosting operations). In FIG. 9, 91 illustrates time-series data of a power value in a normal state (the filter 206 is clean), and 92 illustrates time-series data of a power value in a reproduced filter clogging state obtained by artificially clogging the filter. After a defrosting operation, in the normal state (the filter 206 is clean) 91, nine cycles of intermittent operations were performed. In contrast, the time-series data of the power value 92 in the filter clogging state indicates that the OFF is performed twice (the compressor 201, etc. are turned OFF twice). Thus, two cycles of intermittent operations were performed.

Figure 10:
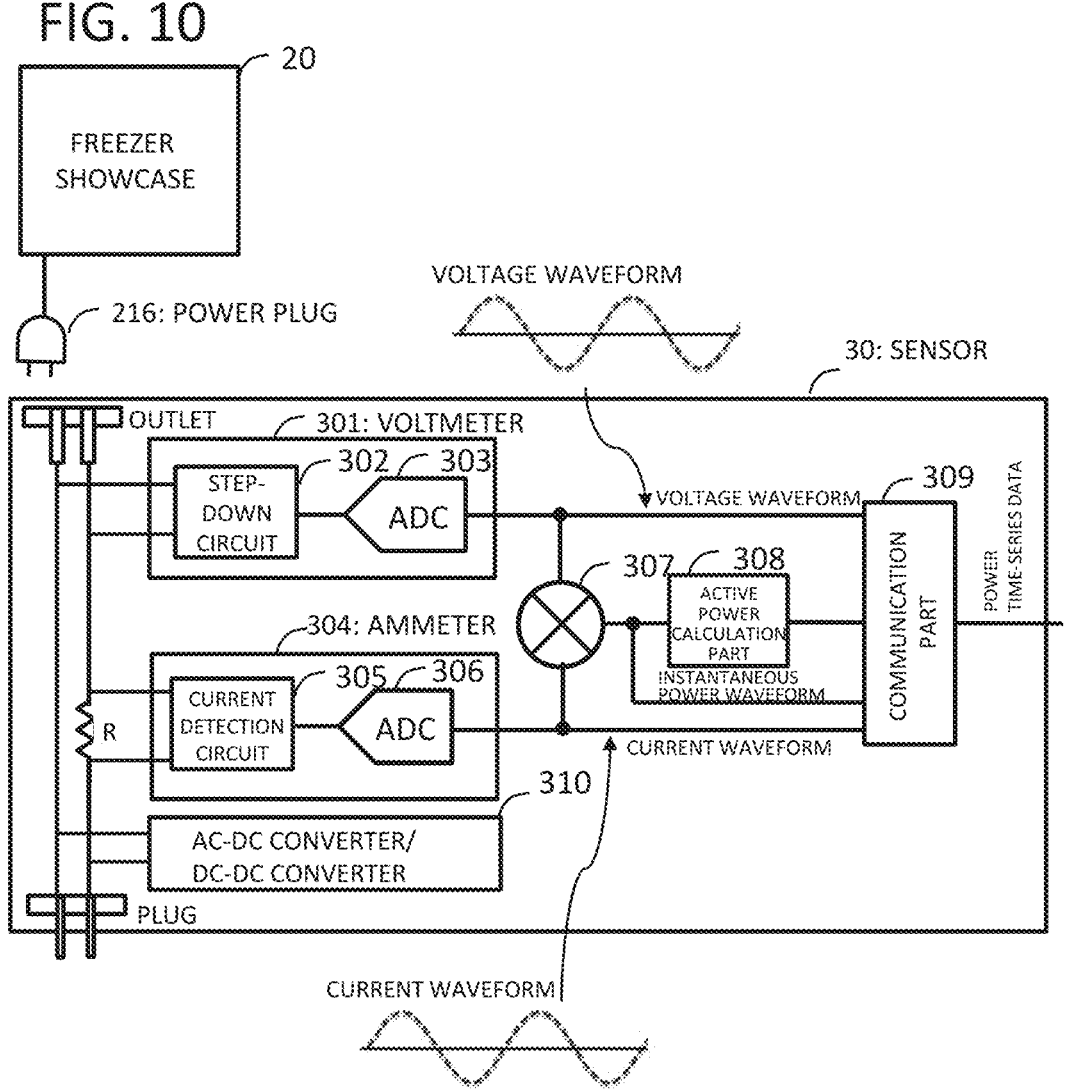
FIG. 10 is a diagram illustrating another example of a sensor.
Figure 11:
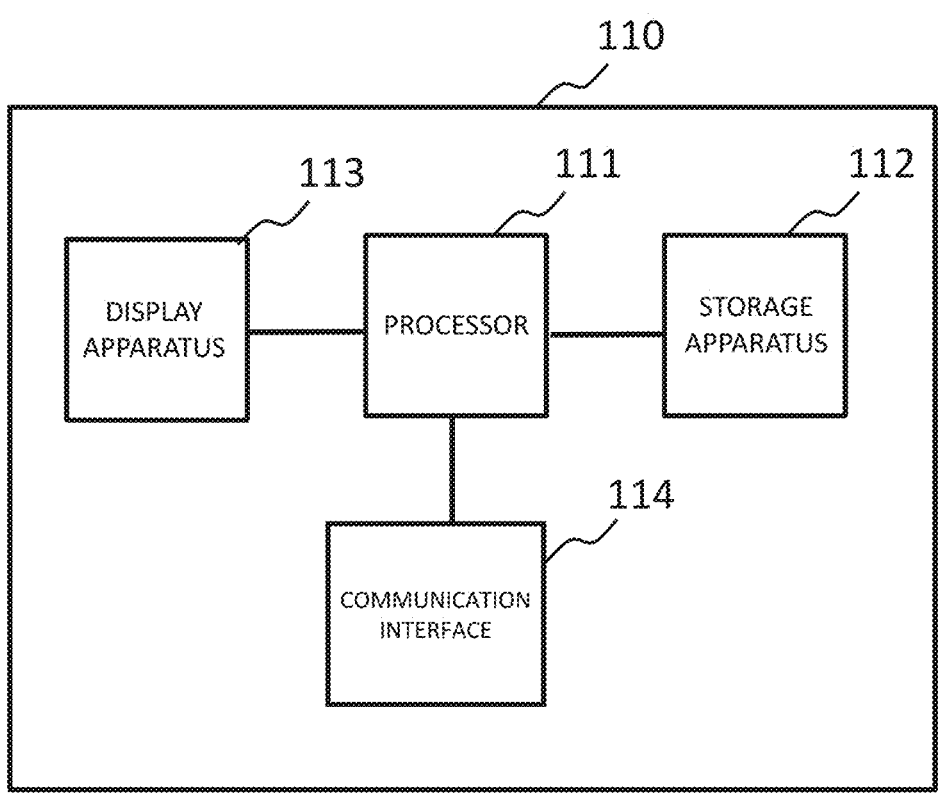
FIG. 11 is a diagram illustrating an example embodiment of the present invention.

FIG. 10 is a diagram illustrating an example of a sensor 30 that measures the power at the power supply part of the freezer showcase 20. In this case, the power supply part of the freezer showcase 20 is a power tap (power strip). As illustrated in FIG. 10, the sensor 30A includes a voltmeter 301 that measures a voltage between terminals of the power outlet and an ammeter 304 that measures a current. The voltmeter 301 includes a step-down circuit 302 that drops a voltage between the terminals and an analog-to-digital converter 303 that converts an analog output voltage of the step-down circuit 302 to a digital signal. The ammeter 304 includes a current sensing circuit 305 that senses a current flowing through the power supply line (load) and an analog-to-digital converter 306 that converts the analog output voltage of the current sensing circuit 305 to a digital signal.

The voltage waveform data from the analog-to-digital converter 303 of the voltmeter 301 and the power waveform data from the analog-to-digital converter 306 of the ammeter 304 are multiplied by, for example, a multiplier 307, and an instantaneous power waveform is obtained. The instantaneous power waveform is smoothed by an active power calculation part 308, and an active power value is calculated. The voltage waveform data, the power waveform data, the instantaneous power waveform, and the active power value are inputted to a communication part 309. The communication part 309 transmits current time-series data (waveform data) or power-value time-series data (waveform data) to the state estimation apparatus 10. When the communication part 309 receives a measurement command from the state estimation apparatus 10, the communication part 309 may transmit current-value time-series data (waveform data) and/or power-value time-series data (waveform data). In FIG. 10, an AC (Alternate Current)-DC (Direct Current) converter/DC-DC converter 310 generates a DC (direct current) power supply from an AC (alternate-current) power supply and supplies the DC power supply to the analog-to-digital converters 303 and 306, the multiplier 307, the active power calculation part 308, and the communication part 309. In FIG. 10, while a single-phase two-wire system AC is illustrated as an example, the measurement is also possible by using three single-phase wattmeters in the case of a three-phase three-wire system AC, for example. Alternatively, the power may be measured based on a two-wattmeter method.

The state estimation apparatus 10 in FIG. 2 may be implemented on a computer apparatus as illustrated in FIG. 12. As illustrated in FIG. 12, a computer apparatus 110 such as server computer includes a processor (a CPU (Central Processing Unit) or a data processing apparatus) 111, a storage apparatus 112 including at least one of a semiconductor memory (e.g., a RAM (Random Access Memory), a ROM (Read-Only Memory), an EEPROM (Electrically Erasable And Programmable ROM), etc.), a HDD (Hard Disk Drive), a CD (Compact Disc), a DVD (Digital Versatile Disc), etc., a display apparatus 113, and a communication interface 114. The communication interface 114 serves as a communication part that acquires power and/or power information acquired by the sensor 30 in FIG. 2 via a communication network. The state estimation apparatus 10 according to the above example embodiment may be realized by storing a program that realizes the functions of the state estimation apparatus 10 in FIG. 2 in the storage apparatus 112 and causing the processor 111 to read and execute the program. For example, the processor 111, by reading the program from the storage device 112 and executing the program, acquires time-series data of a power value of the freezer showcase 20, evaluates power information during the intermittent operation of the freezer showcase 20 from the time-series data of the power value, derives a degree of difference with respect to power information during the intermittent operation of the freezer showcase 20 in a normal state, estimates a clogging state of the filter of the freezer showcase 20 based on the degree of difference, and determines whether cleaning of the filter is necessary. For example, the processor 111 may, by reading the program from the storage device 112 and executing the program, calculate a frequency of the intermittent operation after a defrosting operation of the freezer showcase 20 as the power information during the intermittent operation and output as the degree of difference a result of comparison of the calculated frequency of the intermittent operation and the frequency of the intermittent operation after a defrosting operation of the freezer showcase 20 in a normal state.

While an example of a flat-type open showcase has thus been described, the present invention is, as a matter of course, also applicable to an upright-type open showcase.

Further, each disclosure of Patent Literatures 1 to 9 cited above is incorporated herein in its entirety by reference thereto. It is to be noted that it is possible to modify or adjust the exemplary embodiments or examples within the whole disclosure of the present invention (including the Claims) and based on the basic technical concept thereof. Further, it is possible to variously combine or select a wide variety of the disclosed elements (including the individual elements of the individual claims, the individual elements of the individual examples, and the individual elements of the individual figures) within the scope of the Claims of the present invention. That is, it is self-explanatory that the present invention includes any types of variations and modifications to be done by a skilled person according to the whole disclosure including the Claims, and the technical concept of the present invention.

What is claimed is:

1. A state estimation apparatus comprising:
a processor;
a memory storing program instructions executable by the processor;
a power information storage that stores reference power information during an intermittent operation of a freezer showcase in a normal state; and
a sensor implemented as a power tap including a power outlet into which a power plug of the freezer showcase is inserted, wherein
the processor, when executing the program instructions stored in the memory:
acquires, from the sensor, time-series data of a power value of the freezer showcase;
evaluates power information during the intermittent operation of the freezer showcase for a predefined time period from the time-series data of the power value and derives a degree of difference between the evaluated power information and the reference power information during the intermittent operation of the freezer showcase in the normal state;
estimates a clogging state of a filter of the freezer showcase based on the degree of difference to determine whether cleaning of the filter is necessary; and
provides, for a determination result indicating that the cleaning of the filter is necessary, an output indicating that the cleaning of the filter is necessary, wherein the processor performs any one of:
(a) calculating a frequency of the intermittent operation after a defrosting operation of the freezer showcase, as the power information during the intermittent operation, and outputting, as the degree of difference, a result of comparison of the calculated frequency of the intermittent operation and a reference frequency of the intermittent operation after the defrosting operation of the freezer showcase in the normal state;

(b) calculating a cooling operation time period after the defrosting operation of the freezer showcase, as the power information during the intermittent operation, and outputting, as the degree of difference, a result of comparison of the calculated cooling operation time period and a reference cooling operation time period after the defrosting operation of the freezer showcase in the normal state; and (c) calculating a power amount during a predetermined period of time after the defrosting operation of the freezer showcase, as the power information during the intermittent operation, and outputting, as the degree of difference, a result of comparison of the calculated power amount during the predetermined period of time and a reference power amount during the predetermined period of time after the defrosting operation of the freezer showcase in the normal state, wherein the sensor includes:
- a voltmeter that measures a voltage between terminals of the power outlet to convert a measured voltage to a first digital signal;
- an ammeter that measures current flowing through a power supply to convert a measured current to a second digital signal;
- a multiplier that multiplies the first digital signal and the second digital signal to obtain an instantaneous power value;
- an active power calculator that receives the instantaneous power value from the multiplier to produce an active power value; and
- a transmitter that transmits, to the processor, a time series of the instantaneous power value and/or the active power value, as the time-series data of the power value of the freezer showcase.

2. The state estimation apparatus according to claim 1, wherein the processor calculates a frequency of the intermittent operation after the defrosting operation of the freezer showcase by determining a ratio of time during which a cooling operation is set to be switched on for a constant time period, based on the evaluated power information, and
- if the ratio is equal to or greater than a predetermined value, the processor estimates that clogging of the filter has progressed and determines that the cleaning of the filter is necessary.

3. The state estimation apparatus according to claim 1, wherein the processor calculates a frequency of the intermittent operation using a formula 1/(cooling operation time+ cooling stop time) in one cycle of the intermittent operation, as the frequency of the intermittent operation after the defrosting operation of the freezer showcase, based on the evaluated power information, and
- if the frequency falls below a predetermined lower limit corresponding to the normal state in which clogging of the filter has not progressed, the processor estimates that the clogging of the filter has progressed to determine that the cleaning of the filter is necessary.

4. The state estimation apparatus according to claim 1, wherein the processor compares the degree of difference with a predetermined reference value,
- if the degree of difference differs from the reference value, the processor determines that cleaning of the filter is necessary, and
- if the degree of difference matches the reference value or falls within a range of the reference value, the processor determines that the cleaning of the filter is not necessary.

5. A computer-based state estimation method including:
acquiring, by a processor, from a sensor, time-series data of a power value of a freezer showcase, the sensor implemented as a power tap including a power outlet into which a power plug of the freezer showcase is inserted;
evaluating, by the processor, power information during an intermittent operation of the freezer showcase for a predefined time period from the time-series data of the power value to derive a degree of difference between the evaluated power information and reference power information during the intermittent operation of the freezer showcase in a normal state;
estimating, by the processor, a clogging state of a filter of the freezer showcase based on the degree of difference to determine whether cleaning of the filter is necessary; and
providing, by the processor, for a determination result indicating that the cleaning of the filter is necessary, an output indicating that the cleaning of the filter is necessary, the method further comprising any one of:

(a) calculating a frequency of the intermittent operation after a defrosting operation of the freezer showcase, as the power information during the intermittent operation, and outputting, as the degree of difference, a result of comparison of the calculated frequency of the intermittent operation and a reference frequency of the intermittent operation after the defrosting operation of the freezer showcase in the normal state;

(b) calculating a cooling operation time period after the defrosting operation of the freezer showcase, as the power information during the intermittent operation, and outputting, as the degree of difference, a result of comparison of the calculated cooling operation time period and a reference cooling operation time period after the defrosting operation of the freezer showcase in the normal state; and (c) calculating a power amount during a predetermined period of time after the defrosting operation of the freezer showcase, as the power information during the intermittent operation, and outputting, as the degree of difference, a result of comparison of the calculated power amount during the predetermined period of time and a reference power amount during the predetermined period of time after the defrosting operation of the freezer showcase in the normal state, wherein the sensor includes:
- a voltmeter that measures a voltage between terminals of the power outlet to convert a measured voltage to a first digital signal;
- an ammeter that measures current flowing through a power supply to convert a measured current to a second digital signal;
- a multiplier that multiplies the first digital signal and the second digital signal to obtain an instantaneous power value;
- an active power calculator that receives the instantaneous power value from the multiplier to produce an active power value; and
- a transmitter that transmits, to the processor, a time series of the instantaneous power value and/or the active power value, as the time-series data of the power value of the freezer showcase.

6. The computer-based state estimation method according to claim 5, further comprising:
calculating a frequency of the intermittent operation after the defrosting operation of the freezer showcase by determining a ratio of time during which a cooling operation is set to be switched on for a constant time period, based on the evaluated power information; and if the ratio is equal to or greater than a predetermined value, estimating that clogging of the filter has progressed and determining that the cleaning of the filter is necessary.

7. The computer-based state estimation method according to claim 5, further comprising:
calculating a frequency of the intermittent operation using a formula 1/(cooling operation time+cooling stop time) in one cycle of the intermittent operation, as the frequency of the intermittent operation after the defrosting operation of the freezer showcase, based on the evaluated power information; and
if the frequency falls below a predetermined lower limit corresponding to the normal state in which clogging of the filter has not progressed, estimating that the clogging of the filter has progressed to determine that the cleaning of the filter is necessary.

8. The computer-based state estimation method according to claim 5, comprising:
comparing the degree of difference with a predetermined reference value,
if the degree of difference differs from the reference value, determining that cleaning of the filter is necessary, and
if the degree of difference matches the reference value or falls within a range of the reference value, determining that cleaning of the filter is not necessary.

9. A non-transitory computer readable storage medium storing a program executable by a computer to perform processing comprising:
acquiring, from a sensor, time-series data of a power value of a freezer showcase, the sensor implemented as a power tap including a power outlet into which a power plug of the freezer showcase is inserted;
evaluating power information during an intermittent operation of the freezer showcase for a predefined time period from the time-series data of the power value to derive a degree of difference between the evaluated power information and reference power information during the intermittent operation of the freezer showcase in a normal state;
estimating a clogging state of a filter of the freezer showcase based on the degree of difference to determine whether cleaning of the filter is necessary; and
providing, for a determination result indicating that the cleaning of the filter is necessary, an output indicating that the cleaning of the filter is necessary, the processing further comprising any one of:

(a) calculating a frequency of the intermittent operation after a defrosting operation of the freezer showcase, as the power information during the intermittent operation, and outputting, as the degree of difference, a result of comparison of the calculated frequency of the intermittent operation and a reference frequency of the intermittent operation after the defrosting operation of the freezer showcase in the normal state;

(b) calculating a cooling operation time period after the defrosting operation of the freezer showcase, as the power information during the intermittent operation, and outputting, as the degree of difference, a result of comparison of the calculated cooling operation time period and a reference cooling operation time period after the defrosting operation of the freezer showcase in the normal state; and (c) calculating a power amount during a predetermined period of time after the defrosting operation of the freezer showcase, as the power information during the intermittent operation, and outputting, as the degree of difference, a result of comparison of the calculated power amount during the predetermined period of time and a reference power amount during the predetermined period of time after the defrosting operation of the freezer showcase in the normal state, wherein the sensor includes:
a voltmeter that measures a voltage between terminals of the power outlet to convert a measured voltage to a first digital signal;
an ammeter that measures current flowing through a power supply to convert a measured current to a second digital signal;
a multiplier that multiplies the first digital signal and the second digital signal to obtain an instantaneous power value;
an active power calculator that receives the instantaneous power value from the multiplier to produce an active power value; and
a transmitter that transmits, to the processor, a time series of the instantaneous power value and/or the active power value, as the time-series data of the power value of the freezer showcase.

\* \* \* \* \*